United States Patent
Kim et al.

(10) Patent No.: US 11,095,931 B2
(45) Date of Patent: Aug. 17, 2021

(54) CONTROL DEVICE AND METHOD FOR CONTROL OF BROADCAST RECEIVER

(71) Applicant: SAMSUNG ELECTRONICS CO., LTD., Suwon-si (KR)

(72) Inventors: Joo-youn Kim, Seoul (KR); Yong-hwan Kwon, Seongnam-si (KR); Jung-a Kim, Suwon-si (KR); Bum-jin Lee, Goyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/884,727

(22) Filed: May 27, 2020

(65) Prior Publication Data
US 2020/0288188 A1 Sep. 10, 2020

Related U.S. Application Data

(63) Continuation of application No. 14/193,850, filed on Feb. 28, 2014, which is a continuation of application (Continued)

(30) Foreign Application Priority Data

Dec. 31, 2010 (KR) ........................ 10-2010-0140240

(51) Int. Cl.
*H04N 21/41* (2011.01)
*G08C 17/02* (2006.01)
(Continued)

(52) U.S. Cl.
CPC ......... *H04N 21/4126* (2013.01); *G08C 17/02* (2013.01); *G08C 23/04* (2013.01);
(Continued)

(58) Field of Classification Search
CPC ............ H04N 5/4403; H04N 21/4126; H04N 21/41265; H04N 21/42204;
(Continued)

(56) References Cited

U.S. PATENT DOCUMENTS 6,151,490 A * 11/2000 Schultheiss ...... H04N 21/43637
455/403
2007/0037522 A1 2/2007 Liu et al.
(Continued)

FOREIGN PATENT DOCUMENTS

KR 100703207 B1 4/2007
KR 1020090112101 A 10/2009
(Continued)

OTHER PUBLICATIONS

Communication dated Dec. 19, 2014, issued by the European Patent Office in counterpart European Application No. 11184509.5.
(Continued)

*Primary Examiner* — John W Miller
*Assistant Examiner* — Omer Khalid
(74) *Attorney, Agent, or Firm* — Sughrue Mion, PLLC

(57) ABSTRACT

A control device is provided. The control device includes a first communication interface unit which transmits a control command in a first communication mode which uses a bi-directional wireless communication, a second communication interface unit which transmits a control command in a second communication mode which uses a unidirectional wireless communication, a state determination unit which determines a communication mode of the control device, a user interface unit which displays a user interface window which corresponds to a determined communication mode and receives the control command with respect to a broad-
(Continued)

cast receiver and a control unit which transmits the received control command according to the determined communication mode.

8 Claims, 6 Drawing Sheets

Related U.S. Application Data

No. 13/241,360, filed on Sep. 23, 2011, now Pat. No. 8,687,131.

(51) Int. Cl.
| | | |
|---|---|---|
| H04N 21/422 | (2011.01) | |
| H04N 21/482 | (2011.01) | |
| G08C 23/04 | (2006.01) | |
| H04N 21/472 | (2011.01) | |
| H04N 21/443 | (2011.01) | |
| H04N 21/47 | (2011.01) | |
| H04M 1/72415 | (2021.01) | |

(52) U.S. Cl.
CPC .. *H04M 1/72415* (2021.01); *H04N 21/41265* (2020.08); *H04N 21/4222* (2013.01); *H04N 21/42204* (2013.01); *H04N 21/42208* (2013.01); *H04N 21/42221* (2013.01); *H04N 21/4436* (2013.01); *H04N 21/47* (2013.01); *H04N 21/47217* (2013.01); *H04N 21/482* (2013.01); *G08C 2201/50* (2013.01); *G08C 2201/63* (2013.01); *G08C 2201/93* (2013.01)

(58) Field of Classification Search
CPC ......... H04N 21/42208; H04N 21/4222; H04N 21/42221; H04N 21/4436; H04N 21/47; H04N 21/47217; H04N 21/482; H05N 5/00; H05N 5/44; H05N 5/4401
USPC .................. 348/734, 553, 554, 555, 556
See application file for complete search history.

(56) References Cited

U.S. PATENT DOCUMENTS

| | | | |
|---|---|---|---|
| 2007/0044015 A1 | 2/2007 | Ikeda | |
| 2009/0185081 A1 | 7/2009 | Ueno et al. | |
| 2009/0270035 A1* | 10/2009 | Song .................. | H04H 60/80 |
| | | | 455/41.2 |
| 2010/0008673 A1 | 1/2010 | Nakamura | |
| 2010/0013660 A1 | 1/2010 | Hwang et al. | |
| 2010/0066920 A1 | 3/2010 | Kwak | |
| 2010/0118209 A1 | 5/2010 | Hardacker | |
| 2010/0138764 A1* | 6/2010 | Hatambeiki ..... | H04N 21/42224 |
| | | | 715/765 |
| 2010/0302461 A1* | 12/2010 | Lim .................... | H04N 21/488 |
| | | | 348/734 |
| 2011/0075052 A1 | 3/2011 | Arling | |
| 2011/0157469 A1 | 6/2011 | McRae | |
| 2011/0167447 A1* | 7/2011 | Wong ................ | H04N 21/6125 |
| | | | 725/40 |
| 2011/0191516 A1* | 8/2011 | Xiong .................. | G06F 3/041 |
| | | | 710/305 |

FOREIGN PATENT DOCUMENTS

| | | | |
|---|---|---|---|
| KR | 1020100009292 A | 1/2010 | |
| WO | 2008/048255 A1 | 4/2008 | |
| WO | WO-2008048255 A1 * | 4/2008 | ........... H04N 21/482 |

OTHER PUBLICATIONS

Communication dated Dec. 20, 2016, issued by the European Patent Office in counterpart European Application No. 15175510.5.
Communication dated Dec. 7, 2016, issued by the Korean Intellectual Property Office in counterpart Korean Application No. 10-2010-0140240.
Communication dated Jun. 9, 2016 issued by European Patent Office in counterpart European Application No. 15 175 510.5.
Communication from the European Patent Office dated Oct. 15, 2015 in a counterpart European Application No. 15175510.5.
Communication, dated Mar. 28, 2012, issued by the European Patent Office in corresponding European Application No. 11184509.5.

* cited by examiner

CONTROL DEVICE AND METHOD FOR CONTROL OF BROADCAST RECEIVER

CROSS-REFERENCE TO RELATED APPLICATION

This application is a Continuation Application of U.S. application Ser. No. 14/193,850, filed on Feb. 28, 2014, which is a Continuation Application of U.S. application Ser. No. 13/241,360, filed on Sep. 23, 2011, which was issued U.S. Pat. No. 8,687,131 on Apr. 1, 2014, which claims priority from Korean Patent Application No. 10-2010-0140240, filed on Dec. 31, 2010, in the Korean Intellectual Property Office, the disclosure of which is incorporated herein by reference in its entirety.

BACKGROUND

1. Field

Apparatuses and methods consistent with exemplary embodiments relate to a control device and a method for controlling of a broadcast receiver, and more particularly, to a control device and a method for controlling a broadcast receiver with the control device by using a unidirectional wireless communication when the broadcast receiver cannot be controlled by a bi-directional wireless communication.

2. Description of the Related Art

A broadcast receiver is a device receiving digital satellite broadcasting. The broadcast receiver converts audio/video signals input from a digital broadcasting or an analog broadcasting transmitted from a broadcast station into a TS (transport stream) signal and displays the TS signal or transmits the TS signal to an external display device. For example, the broadcast receiver may be an IPTV (Internet Protocol Television) including a digital TV and a Video On Demand player and a set-top box.

Such broadcast receiver is usually controlled by a control device such as a remote control, but recently, a technology has developed so that the broadcast receiver can be controlled by a general portable device using wireless-fidelity (Wi-Fi).

In the case of a portable device using Wi-Fi, a sleep mode is used to reduce battery consumption. However, when the portable device is in a sleep mode, a waiting time for using the Wi-Fi is necessary in order to control the broadcast receiver. Accordingly, a device demanding a prompt action by a user (such as a remote controller) may be inconvenient for a user.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a control device and a method of controlling a broadcast receiver with the control device by using a unidirectional wireless communication when the broadcast receiver cannot be controlled by a bi-directional wireless communication.

According to an exemplary embodiment, a control device which controls a broadcast receiver includes a first communication interface unit which transmits a control command in a first communication mode which uses a bi-directional wireless communication, a second communication interface unit which transmits a control command in a second communication mode which uses a unidirectional wireless communication, a state determination unit which determines a communication mode of the control device, a user interface unit which displays a user interface window which corresponds to the determined communication mode and receives a control command with respect to the broadcast receiver, and a control unit which transmits the received control command according to the determined communication mode.

The state determination unit may determine the communication mode of the control device to be a second communication mode if it is impossible for the control device to communicate with the broadcast receiver via the first communication mode and determines the communication mode of the control device to be a first communication mode if it is possible for the control device to communicate with the broadcast receiver via the first communication mode.

The state determination unit may determine that the first communication mode is not in a communication able state if the control device is in a sleep mode or a wake-up mode.

The user interface unit where a user selects the first communication mode or the second communication mode and the state determination unit may determine the communication mode of the selected communication mode to be the communication mode of the control device.

The control device may further include a storing unit which stores at least one user interface window between a first user interface window which corresponds to a first communication mode and a second user interface window which corresponds to a second communication mode, and the second user interface window comprises a selection region in order to receive a mode conversion command into the first communication mode.

The user interface unit may indicate that the control device operates in a first communication mode, if the first communication mode is in a communication able state while the second user interface window is being displayed.

The user interface unit may display a same user interface window as displayed before the control device entered into a sleep mode or an off mode, if the determined control mode is a first communication mode.

The second interface unit may be a low-power communication interface unit which operates at a lower power than a first interface unit.

The first communication mode may become a non-communication able state if the control device entered into a sleep mode.

The bi-directional wireless communication may be at least one among a Wi-Fi, radio frequency (RF), Bluetooth, and Wireless high-definition multimedia interface-consumer electronic control (HDMI-CEC), and the unidirectional wireless communication is an infrared data association.

According to an exemplary embodiment, there is provided a method of controlling a broadcast receiver in a control device comprising determining a communication mode of the control device between a first communication mode which uses a bi-directional wireless communication and a second communication mode which uses a unidirectional wireless communication, displaying a user interface window which corresponds to the determined communication mode, receiving a control command with respect to the broadcast receiver via the displayed user interface window, and transmitting the input control command to the broadcast receiver according to the determined communication mode.

The determining the communication mode may determine a communication mode of the control device to be a second communication mode if it is impossible for the control device to communicate with the broadcast receiver via the first communication mode, and determine a communication mode of the control device to be a first communication mode if it is possible for the control device to communicate with the broadcast receiver via the first communication mode.

The determining the communication mode may determine that the first communication mode is in a non-communication able state if the control device is in a sleep mode or a wake-up mode.

The determining the communication mode may determine a communication mode which is selected by a user as a communication mode of the control device.

The displaying the user interface window may display at least one pre-stored user interface window between a first user interface window which corresponds to a first communication mode and a second user interface window which corresponds to a second communication mode, and comprise a selection area in order to receive a mode conversion command into the first communication mode.

The method for controlling the broadcast receiver further includes indicating that it is possible to operate in a first communication mode if the first communication mode is in a communication able state while the second user interface window is displayed.

The displaying the user interface window may display a user interface window which is equal to a user interface window which is displayed by the control device before entering into one mode between a sleep mode and an off mode, if the determined control mode is a first communication mode.

The second communication mode may use a communication interface which operates at a lower power than a first communication mode.

The method for controlling the broadcast receiver may further include the first communication mode becoming a non-communication able state if the control device enters into a sleep mode.

The bi-directional wireless communication may be at least one among RF, Bluetooth, and Wireless HDMI-CEC, and the unidirectional wireless communication may be an Infrared Data Association.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
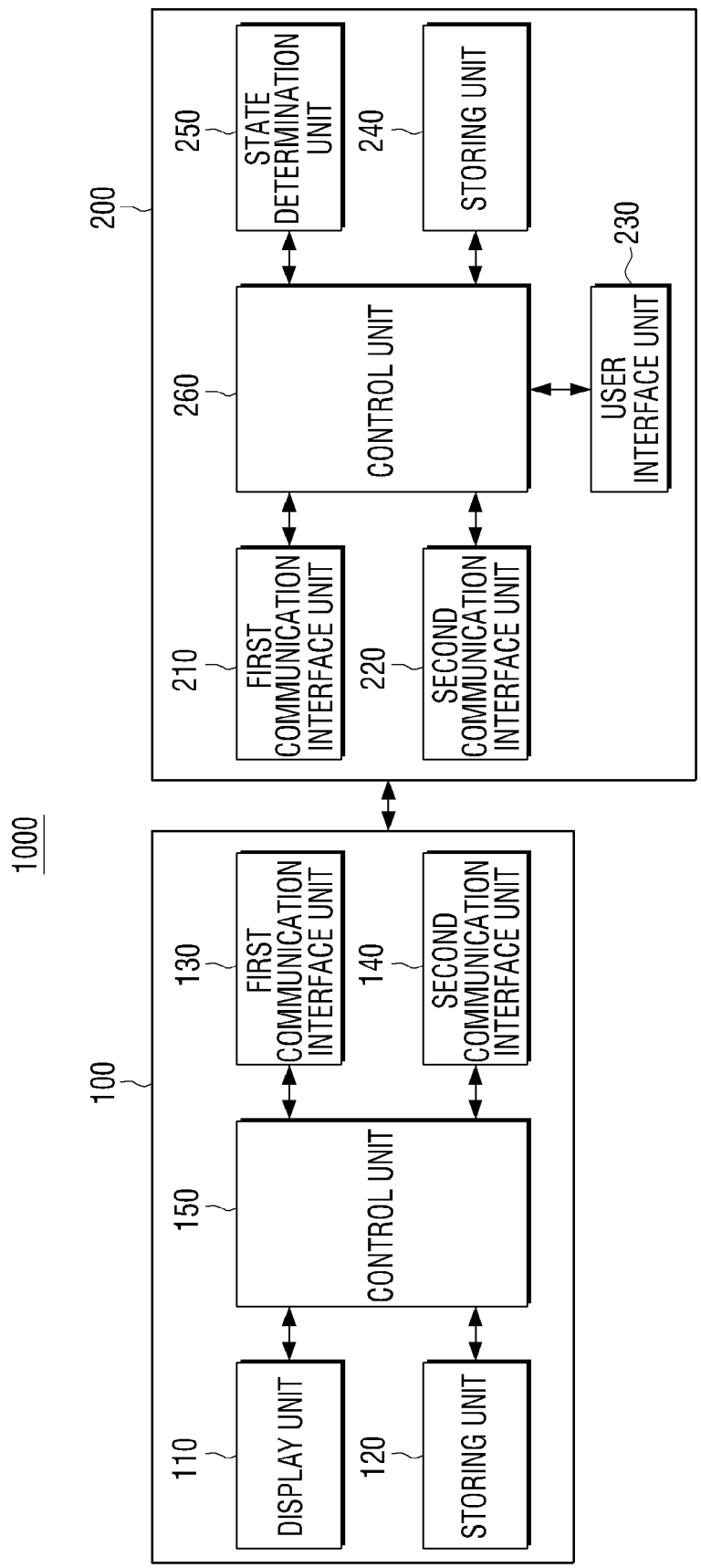
FIG. 1 is a block diagram illustrating a configuration of a home network system according to an exemplary embodiment.

Certain exemplary embodiments will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 is a block diagram illustrating a configuration of a home network system according to an exemplary embodiment.

Referring to FIG. 1, the home network system 1000 comprises a broadcast receiver 100 and a control device 200. The broadcast receiver 100 is a device providing a user with an image or audio/video information and may comprise a digital TV, a set-top box, a PC, a notebook, and a personal media player (PMP). Specifically, the broadcast receiver 100 may comprise a display unit 110, a storing unit 120, a first communication interface unit 130, a second communication interface unit 140, and a control unit 150.

The display unit 110 may display information provided from the broadcast receiver 100. The display unit 110 may include a device, such as a touch pad, which is capable of receiving and outputting data and may be an image display device such as a liquid crystal display (LCD), a plasma display panel (PDP), and a cathode ray tube (CRT). Accordingly, a user may view on a screen of the device, information received from the broadcast receiver 100.

If the broadcast receiver 100 is a device such as a digital TV, the display unit 110 may be an internal component of the digital TV and if the broadcast receiver 100 is a set-top box, the display unit 110 may be an external device (for example: a TV or a monitor connected to the set-top box).

The storing unit 120 may store content corresponding to a variety of services provided by the broadcast receiver 100. The storing unit 120 may be an internal storing medium and an external storing medium of the broadcast receiver 100 such as a Removable Disk including a USB memory, a storing medium connected to a separate host, and a web server via a network.

The first communication interface unit 130 receives a control command via a bi-directional wireless communication. Specifically, the first communication interface unit 130 may form a link with the first communication interface unit 210 of the control device 200, and transmit a variety of information which the control device 200 requests, or receive the control command of a user from the control device 200. Herein, the bi-directional wireless communication may include all existing communication technologies such as BT (Bluetooth). RF, Wi-Fi, HDMI-CEC, and Wireless HDMI-CEC and all bi-directional wireless communication technologies in the future.

The second communication interface unit 140 receives a control command via a unidirectional wireless communication. Specifically, the second communication unit 140 may receive the control command using the unidirectional wireless communication of the second communication interface unit 220 of the control device 200. Herein, the unidirectional wireless communication may include all existing communication technologies such as Infrared Data Association and all unidirectional wireless technologies in the future.

The control unit 150 controls each configuration in the broadcast receiver 100. Specifically, the control unit 150 may execute a service or operation in response to a control command received from the first communication interface unit 130 or the second communication interface unit 140, thereby providing a service or executing the control command. For example, if the broadcast receiver 100 receives a 'TV channel up' control command from the control device 200, the control unit 150 may execute the control command and change the channel of the TV.

The control unit 150 may transmit information related to a currently provided service to the control device 200. Specifically, the control unit 150, may transmit information which will be helpful for a user, (for example, channel information, current volume, play time, remaining play time, current time, and Electronic Program Guide (EPG)), to the control device 200 in a process of controlling operations of the broadcast receiver 100. Such an operation of transmitting information related to the service may be performed via the first communication interface unit 130.

The control device 200 is a device which may control the broadcast receiver 100 by using the bi-directional wireless communication or the unidirectional wireless communication and may comprise a remote control, a mobile phone, an MP3, a PMP, a navigation, and a digital frame. Specifically, the control device 200 may include the first communication interface unit 210, the second communication interface unit 220, a user interface unit 230, a storing unit 240, a state determination unit 250, and a control unit 260.

The first communication interface unit 210 transmits a control command in a first communication mode using the bi-directional wireless communication. Specifically, the first communication interface unit 210 may form a link for performing the bi-directional wireless communication with the broadcast receiver 100 and transmit a control command received from a user interface unit 230, which will be described later, to the broadcast receiver 100 via the formed link. In addition, the first communication interface unit 210 may receive information which will be useful for a user from the broadcast receiver 100.

The second communication interface unit 220 transmits a control command in a second communication mode using the unidirectional wireless communication. Specifically, if the first communication interface unit 210 is not in a communication able state, the second communication interface unit 220 may transmit a control command received via a user interface unit 230 which will be described later. The control command transmitted via the second communication interface unit 220 is received from the second communication interface unit 140 of the broadcast receiver 100. Herein, since the second communication interface unit 220 uses the unidirectional wireless communication, the second communication interface unit 220 operates at a lower power than the first communication interface unit 210 using the bi-directional wireless communication.

The user interface unit 230 displays a user interface (UI) window for selecting a communication mode. Specifically, the user interface unit 230 provides a plurality of function keys that a user may set or select a variety of functions provided by the broadcast receiver 100 and may display the user interface window for selecting one between the first communication mode or the second communication mode. The user interface unit 230 may comprise a device, such as a touch pad, allowing the selection of the communication mode as well as the input of control commands. Furthermore, the device may include a keypad which can be coupled to a displaying device. Accordingly, a user may select one communication mode. Such an operation of selecting a communication mode may be automatically performed by a state determination unit 250 which will be described later.

The user interface unit 230 may display a user interface window according to the type of communication mode. Specifically, the user interface unit 230 may display the user interface window according to the determined communication mode performed by the state determination unit 250 which will be described later, or selected by a user. For example, if the control device 200 operates in the second communication mode, the user interface unit 230 may display the second user interface window receiving relatively a simple control command only. Herein, the second user interface window may include a selection region for receiving a command to convert a current communication mode into the first communication mode from a user. A specific shape of the second user interface window will be described later with reference to FIGS. 3 and 4.

The user interface unit 230 may indicate that the control device 200 may operate in the first communication mode, if the first communication mode is in a communication able state while the second user interface window is displayed. Specifically, if it is determined that the communication mode is converted from the second communication mode into the first communication mode by the state determination unit 250 which will be described later, the user interface unit 230 may indicate that the broadcast receiver 100 may be controlled using the first communication mode. In addition, the user interface unit 230 may be automatically converted into the first interface window and displayed as such without additional information displaying operations.

If the control device 200 operates in the first communication mode, the user interface unit 230 may display the first user interface window corresponding to the first communication mode. The first user interface window may include a user interface window according to the operation mode of the broadcast receiver 100. For example, according to a feature of the broadcast receiver 100, the user interface window may display a user interface window responding to a variety of modes such as a TV control mode, a VTR control mode, and a search control mode. Namely, if the user watches a TV by using a broadcast receiver, the user interface unit 230 may display the specialized user interface window in controlling a TV. In case where the user performs an internet search by using the broadcast receiver, the user interface unit 230 may display the specialized user interface window for internet searches.

The user interface unit 230 may display a same user interface window as the one displayed in the previous normal mode. Specifically, when the user interface unit 230 displays the first interface window, the user interface unit 230 may display the same user interface window as the one displayed before the display device 200 entered into one mode between a sleep mode and an off mode. For example, if the control device 200 entered into the sleep mode or the off mode while the user interface unit 230 displays the user interface window for controlling a TV screen, the user interface unit 230 may display the user interface window for controlling the TV screen which was displayed in the first communication mode when the control device 200 operates in the first communication mode again.

The user interface unit 230 receives a control command. Specifically, the user interface unit 230 may receive the control command for controlling the broadcast receiver 100 via the user interface window as described above.

The user interface unit 230 may display information useful for a user. Specifically, the user interface unit 230 may display information which is received via the first communication interface unit 210 and will be useful for the user.

The storing unit 240 may store a plurality of user interface windows according to the type of communication mode. The storing unit 240 may store information on the user interface window displayed by the user interface unit 230 before entering into the at least one mode between the sleep mode and the off mode by the control device 200. The storing unit 240 may store information received from the first communication interface unit 210. Such storing unit 240 may be in the form of an internal and/or an external storing medium, for example, a Removable Disk including a USB memory and a Web server via a network. The user interface window according to the communication mode may be provided by the broadcast receiver 100.

The state determination unit 250 may determine a communication mode of the control device 200. Specifically, when the state determination unit 250 determines that the control device 200 is in the first communication mode, the state determination unit 250 may communicate with the broadcast receiver 100 via the bi-directional wireless communication, or, if the control device 200 is in the normal mode. Conversely, when the state determination unit 250 determines that the control device 200 may not communicate with the broadcast receiver 100 via the bi-directional wireless communication, or, if the control device 200 is in the off-mode, the sleep-mode, and the wake-up mode, the state determination unit 250 determines that the control device 200 is in the second communication mode.

Herein, the off-mode is a state where a power of the control device 200 is off, the sleep-mode is a state where the bi-directional wireless communication is stopped in order to reduce a battery consumption, the wake-up mode is a process of re-operating the stopped bi-directional wireless communication, and a normal mode is a state where Wi-Fi between the control device 200 and the broadcast receiver 100 is connected. The normal mode may include a TV mode for controlling a TV, such as the one illustrated in FIG. 4, a VTR mode for controlling a VTR, such as the one illustrated in FIG. 5, and a search mode for an internet search.

The state determination unit 250 may determine a communication mode of the control device 200 according to a selected communication mode by a user via the user interface unit 230. Specifically, although the control device 200 may communicate in the first communication mode, the state determination unit 250 may determine a communication mode of the control device 200 as the second communication mode if the user wants the control device 200 to operate in the second communication mode.

The control unit 260) controls each configuration of the control device 200. Specifically, the control unit 260 may determine an operation mode of the control device 200 via the state determination unit 250 and control the user interface unit 230 so that the user interface window may be displayed according to the determined operation mode.

If the control device unit 260 receives a request for changing a communication mode from a user via the user interface unit 230, the control unit 260 may control the user interface unit 230 so that the user interface window may be displayed according to the requested communication mode.

In addition, if the control unit 260 receives a control command of the broadcast receiver 100 from a user, the control unit 260 may transmit the control command according to the current communication mode. Specifically, when the control device 200 is in the first communication mode, the control unit 260 may control the first communication interface unit 210 so that the control command input via the bi-directional wireless communication may be transmitted. In addition, when the control device 200 is in the second communication mode, the control unit 260 may control the second communication interface unit 220 so that the control command input via the unidirectional wireless communication may be transmitted.

In case where the control device 200 has not been operated for a long time, or, in case where the control device 200 is in the sleep mode, the control unit 260 may control the first communication interface unit 210 so that the first communication mode may not be in a communication able state.

In case where the control unit 260 receives information from the broadcast receiver 100, the control unit 260 may control the user interface unit 230 so that the received information may be displayed with the user interface window corresponding to the current operation mode. Specifically, the broadcast receiver 100 may transmit information (for example: channel information, current volume, playing time, left playing time, current time, and Electronic Program Guide) which will be useful for a user. Thus, the control unit 260 may control the user interface unit 230 so that the information may be displayed on the user interface window according to the current operation mode. The received information related to the services may be displayed continuously, displayed according to a predetermined period, or displayed according to the user's control.

Accordingly, the control device 200 according to an exemplary embodiment may control the broadcast receiver 100 by using the unidirectional wireless communication even when bi-directional wireless communication is impossible, thereby enhancing a user convenience. In addition, since the control device 200 displays the optimized user interface window according to a communication mode, the user may control of the broadcast receiver more conveniently.

In the description of FIG. 1, the control device 200 is described to control only one broadcast receiver 100, but the control device 200 may control a plurality of broadcast receivers, which will be described in the following description with reference to FIG. 2.

Figure 2:
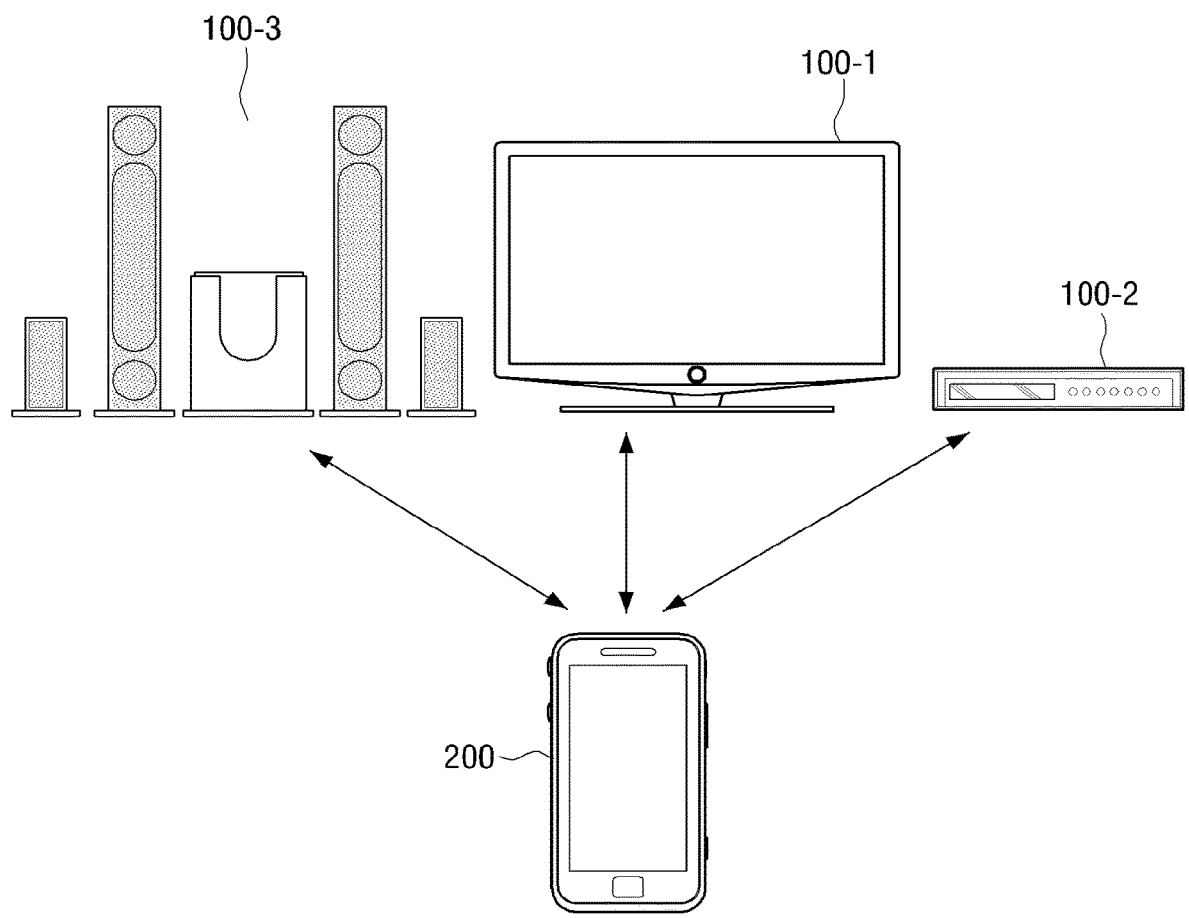
FIG. 2 is a view illustrating an example of a connection of a home network system 1000 according to an exemplary embodiment.

FIG. 2 is a diagram illustrating an example of a home network system 1000 according to an exemplary embodiment.

Referring to FIG. 2, the control device 200 according to FIG. 1 is a remote control and may communicate with a plurality of broadcast receivers in the home network such as a TV 100-1, a BDP (Blue-ray Disk Player, 100-2) and a HTS 100-3 in a unidirectional wireless communication and a bi-directional wireless communication.

Accordingly, if the control device 200 operates in the normal mode, the control device 200 may control the plurality of broadcast receivers by using the bi-directional wireless communication. If the control device 200 operates in the sleep mode and the wake-up mode, the control device 200 may control the broadcast receiver by using the unidirectional wireless communication. For example, if a user wakes up the control device 200 which has entered into a sleep mode, the control device 200 may transmit a control command to the TV 100-1 by using the unidirectional wireless communication when the controlled device was the TV 100-1. In addition, when the controlled device was the BDP 100-2, the control device 200 may transmit a control command to the BDP 100-2 by using the unidirectional wireless communication.

In the description of FIG. 2, the control device 200 controls a broadcast receiver connected to the TV 100-1 in the bi-directional wireless communication and the unidirectional wireless communication mode, but the control device 20X) may also control the Blu-ray Disk Player (BDP) 100-2 and the HTS 100-3.

FIG. 2, illustrates three components or broadcast receivers in the home network as an example, but there is no limit to the number of the broadcast receivers which may be connected in the home network. In addition, in the description of an exemplary embodiment, the control device 200 is described as a device controlling only the broadcast receiver 100, but the control device 200 may be used to control any number of devices in the home network capable of communicating in the unidirectional wireless communication and the bi-directional wireless communication.

Figure 3:
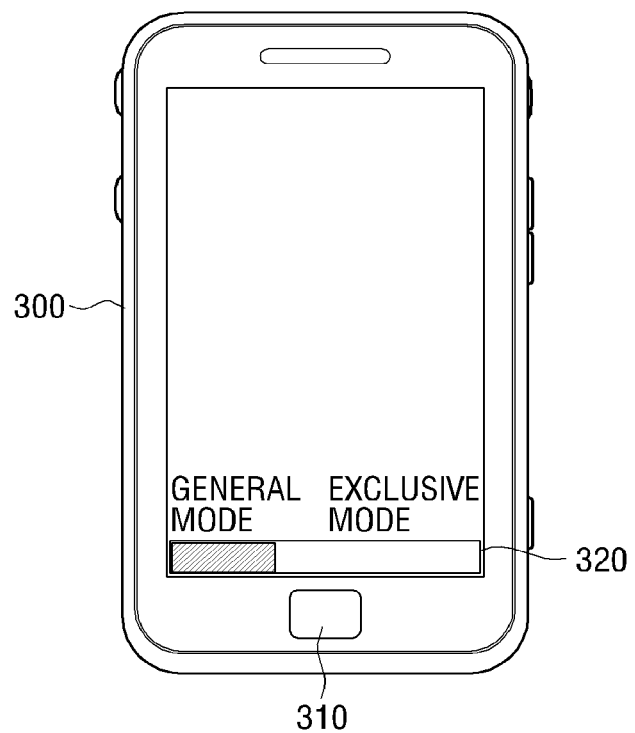
FIGS. 3 to 5 are views illustrating an example of a user interface window which may be displayed on a control device.
Figure 4:
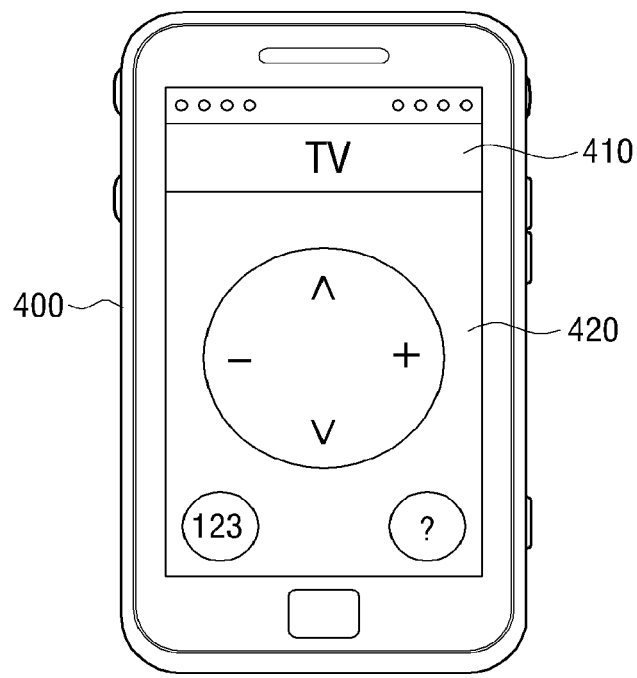
Figure 5:
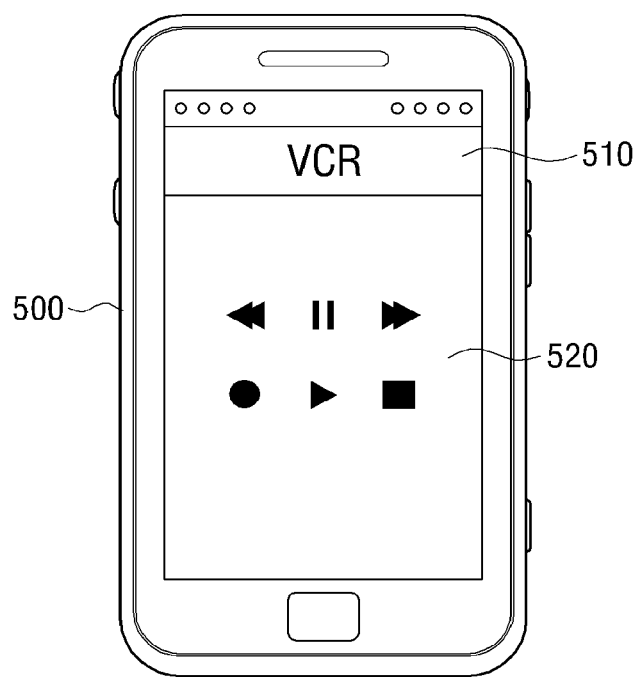

FIGS. 3 to 5 are views illustrating a variety of examples of the user interface windows which may be displayed on the control device 200.

Specifically, FIG. 3 is a view illustrating an example of the user interface window where a user selects a communication mode.

Referring to FIG. 3, the user interface window 300 includes a first region 320 where the user selects a communication mode. Herein, a 'general mode' represents the second communication mode, and an 'exclusive mode' represents the first communication mode. By using a slide bar as illustrated in FIG. 3, the user may convert communication mode from the second communication mode into the first communication mode.

In FIG. 3, only regions where a user selects the communication mode are illustrated, but regions having a simple remote control shape (for example, a channel up-down and a volume up-down) may be also illustrated.

On the other hand, if the control device 200 e wakes-up and operates in the first communication mode, or the user converts the second communication mode into the first communication mode via the user interface window illustrated in FIG. 3, the user display window as illustrated in FIG. 4 may be displayed.

FIG. 4 and FIG. 5 are views illustrating an example of the user interface window displayed on the user interface unit 130 if the control device 200 operates in the first communication mode.

Referring to FIG. 4, the user interface window 400 includes the first region 410 displaying a TV mode which is a current operation mode and the second region 420 for receiving a control command for the TV from a user.

When the control device 200 controls the VTR device instead of the TV, the user interface window 500 may be displayed as illustrated in FIG. 5.

Referring to FIG. 5, the user interface window 500 includes the first region 510 displaying the VTR which is the current operation mode and the second region 520 for receiving the control command for the VTR from the user.

Figure 6:
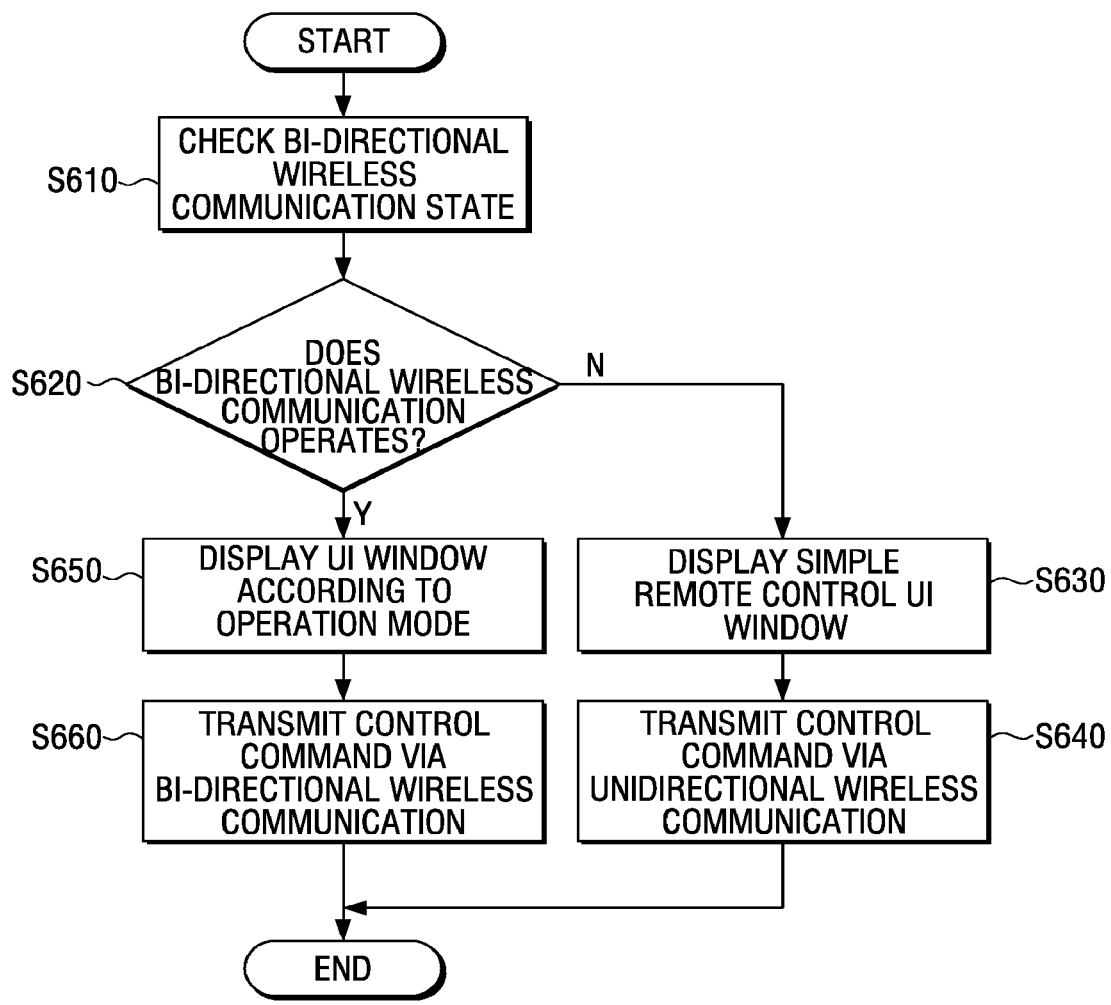
FIG. 6 is a flowchart to explain a method of controlling a broadcast receiver according to an exemplary embodiment.

FIG. 6 is a flowchart describing a control method of the broadcast receiver 100 according to an exemplary embodiment.

First, at operation S610 a communication mode of the control device between the first communication mode using the bi-directional wireless communication and the second communication mode using the unidirectional wireless communication is determined. Specifically, if the control device 200 is in the sleep mode or the wake-up mode, the first communication mode carrying out the bi-directional wireless communication may be determined to be in a non-communication able state. If the control device 200 is in the normal mode, the first communication mode may be determined to be in an operable state. These determinations may be selected by a user.

If the bi-directional wireless communication is determined to be in a non-operable state S620-N, the second user interface window corresponding to the second communication mode is displayed S630, and a control command is received via the displayed user interface window, and then the received control command is transmitted S640 via the unidirectional wireless communication.

If the bi-directional wireless communication is determined to be in an operable state S620-Y, the user interface window corresponding to the current operation mode is displayed S650, and the control command is received via the displayed user interface window and then the received control command is transmitted via the bi-directional wireless communication S660.

Therefore, the method of controlling the broadcast receiver according to an exemplary embodiment may control the broadcast receiver by using the unidirectional wireless communication even when bi-directional wireless communication is impossible, thereby enhancing a user convenience. The method of controlling the broadcast receiver as illustrated in FIG. 6 may be carried out on the control device having a configuration of FIG. 1 as well as on the broadcast receiver having other configurations.

The foregoing exemplary embodiments and advantages are merely exemplary and are not to be construed as limiting the exemplary embodiments. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A control device for use with a display apparatus, the control device comprising:
   a user interface unit configured to receive a user input for controlling the display apparatus;
   a bi-directional communication interface;
   a uni-directional communication interface; and
   a controller,
   wherein the control device operates in one of a plurality of modes including a normal mode in which the bi-directional communication interface is in an active state, a sleep mode in which the bi-directional communication interface is in an inactive state, and a wake-up mode in which a state of the bi-directional communication interface changes from the inactive state to the active state,
   wherein the controller is configured to:
   receive a user input for waking up the control device via the user interface unit while the control device is in the sleep mode,
   in response receiving the user input for waking up the control device, change a mode of the control device from the sleep mode to the normal mode via the wake-up mode,
   while the control device is in the wake-up mode, control the control device to communicate with the display apparatus via the uni-directional communication interface,
   after the mode of the control device is changed to the normal mode, control the control device to communicate with the display apparatus via the bi-directional communication interface instead of the uni-directional communication interface, and
   if no user input is received via the user interface unit for a predetermined time while the control device is in the normal mode, change a mode of the control device from the normal mode to the sleep mode and communicate with the display apparatus via the uni-directional communication interface instead of the bi-directional communication interface.

2. The control device as claimed in claim 1, wherein the bi-directional communication interface corresponds to a Bluetooth (BT) module and the uni-directional communication interface corresponds to an infrared (IR) module configured to transmit IR.

3. The control device as claimed in claim 1, wherein the control device further comprises a display,
wherein the controller is further configured to:
display a user interface (UI) for receiving a user input to change a uni-directional communication mode to a bi-directional communication mode.

4. The control device as claimed in claim 1, wherein the controller is further configured to:
based on a user input being received while the control device is connected to the display apparatus through the bi-directional communication interface, identify a type of the user input, and
transmit a signal corresponding to the user input to the display apparatus through one of the bi-directional and uni-directional communication interfaces based on the type of the user input.

5. The control device as claimed in claim 1, wherein the controller is configured to, based on a user input being received after the connection is disconnected, transmit a signal corresponding to the user input to the display apparatus through the uni-directional communication interface.

6. A display system comprising:
a display apparatus; and
a control device for use with the display apparatus,
wherein the control device comprises:
a user interface unit configured to receive a user input for controlling the display apparatus;
a bi-directional communication interface;
a uni-directional communication interface; and
a controller,
wherein the control device operates in one of a plurality of modes including a normal mode in which the bi-directional communication interface is in an active state, a sleep mode in which the bi-directional communication interface is in an inactive state, and a wake-up mode in which a state of the bi-directional communication interface changes from the inactive state to the active state,
wherein the controller is configured to:
receive a user input for waking up the control device via the user interface unit while the control device is in the sleep mode,
in response receiving the user input for waking up the control device, change a mode of the control device from the sleep mode to the normal mode via the wake-up mode,
while the control device is in the wake-up mode, control the control device to communicate with the display apparatus via the uni-directional communication interface,
after the mode of the control device is changed to the normal mode, control the control device to communicate with the display apparatus via the bi-directional communication interface instead of the uni-directional communication interface, and
if no user input is received via the user interface unit for a predetermined time while the control device is in the normal mode, change a mode of the control device from the normal mode to the sleep mode and communicate with the display apparatus via the uni-directional communication interface instead of the bi-directional communication interface.

7. A control device for use with a display apparatus, the control device comprising:
a user interface unit configured to receive a user input for controlling the display apparatus;
a bi-directional communication interface;
a uni-directional communication interface; and
a controller,
wherein the controller is configured to:
receive a user input for waking up the control device via the user interface unit while the bi-directional communication interface is inactive state,
in response receiving the user input for waking up the control device, control to change the state of the bi-directional communication interface from inactive state to active state,
while the state of the bi-directional communication interface is being changed from inactive state to active state, control the control device to communicate with the display apparatus via the uni-directional communication interface, and
after the state of the bi-directional communication interface is changed to active state, control the control device to communicate with the display apparatus via the bi-directional communication interface instead of the uni-directional communication interface,
if no user input is received via the user interface unit for a predetermined time while the bi-directional communication interface is active state, change the state of the bi-directional communication interface from active state to inactive state and communicate with the display apparatus via the uni-directional communication interface instead of the bi-directional communication interface.

8. A display system comprising:
a display apparatus; and
a control device for use with the display apparatus,
wherein the control device comprises:
a user interface unit configured to receive a user input for controlling the display apparatus;
a bi-directional communication interface;
a uni-directional communication interface; and
a controller,
wherein the controller is configured to:
receive a user input for waking up the control device via the user interface unit while the bi-directional communication interface is inactive state,
in response receiving the user input for waking up the control device, control to change the state of the bi-directional communication interface from inactive state to active state,
while the state of the bi-directional communication interface is being changed from inactive state to active state, control the control device to communicate with the display apparatus via the uni-directional communication interface,
after the state of the bi-directional communication interface is changed to active state, control the control device to communicate with the display apparatus via the bi-directional communication interface instead of the uni-directional communication interface, and
if no user input is received via the user interface unit for a predetermined time while the bi-directional communication interface is active state, change the state of the bi-directional communication interface from active state to inactive state and communicate with the display apparatus via the uni-directional communication interface instead of the bi-directional communication interface.

\* \* \* \* \*